Nov. 24, 1936. W. C. MILLER 2,062,067
PROTECTIVE DEVICE FOR SAFES
Filed Sept. 24, 1934 5 Sheets-Sheet 2
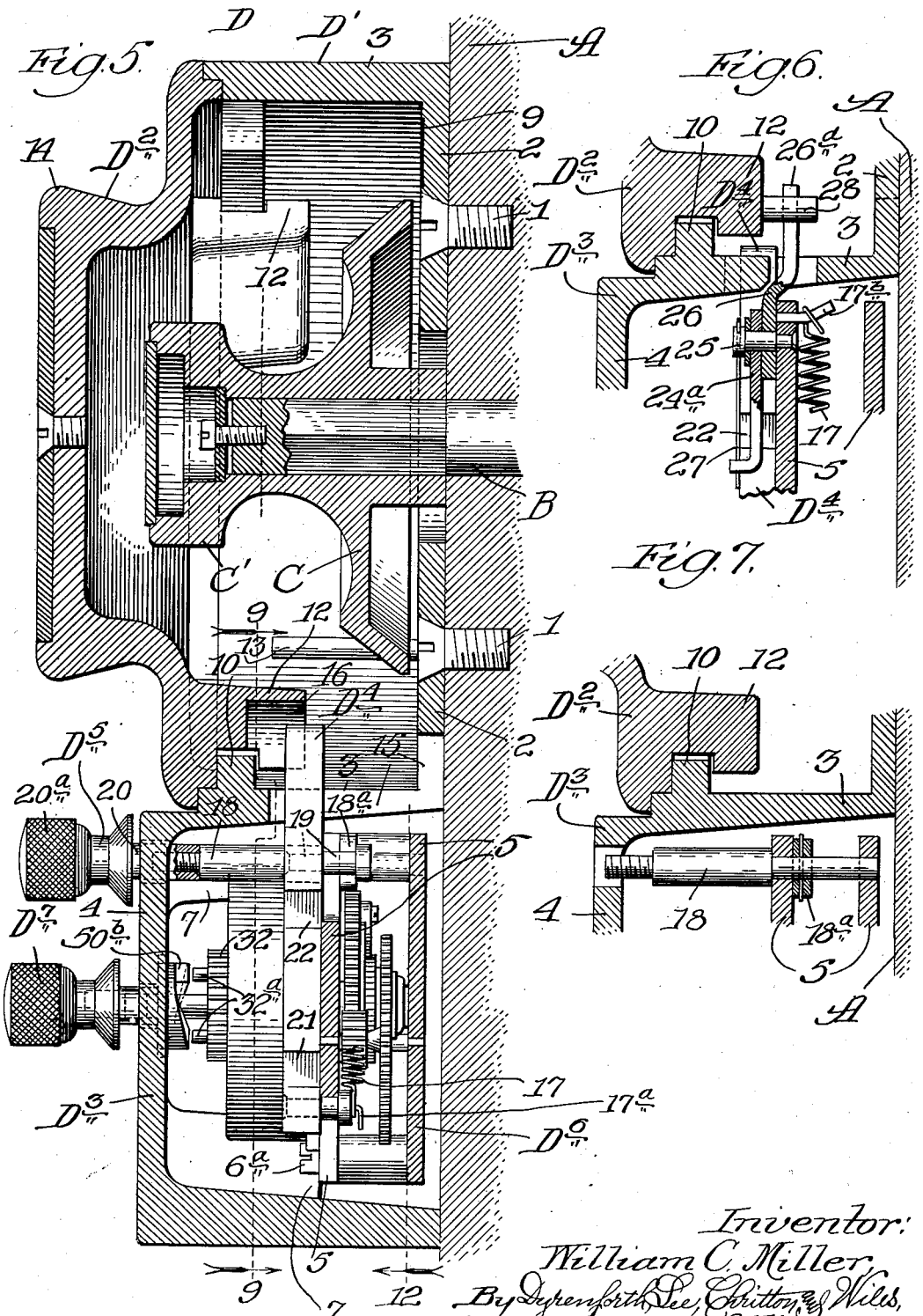

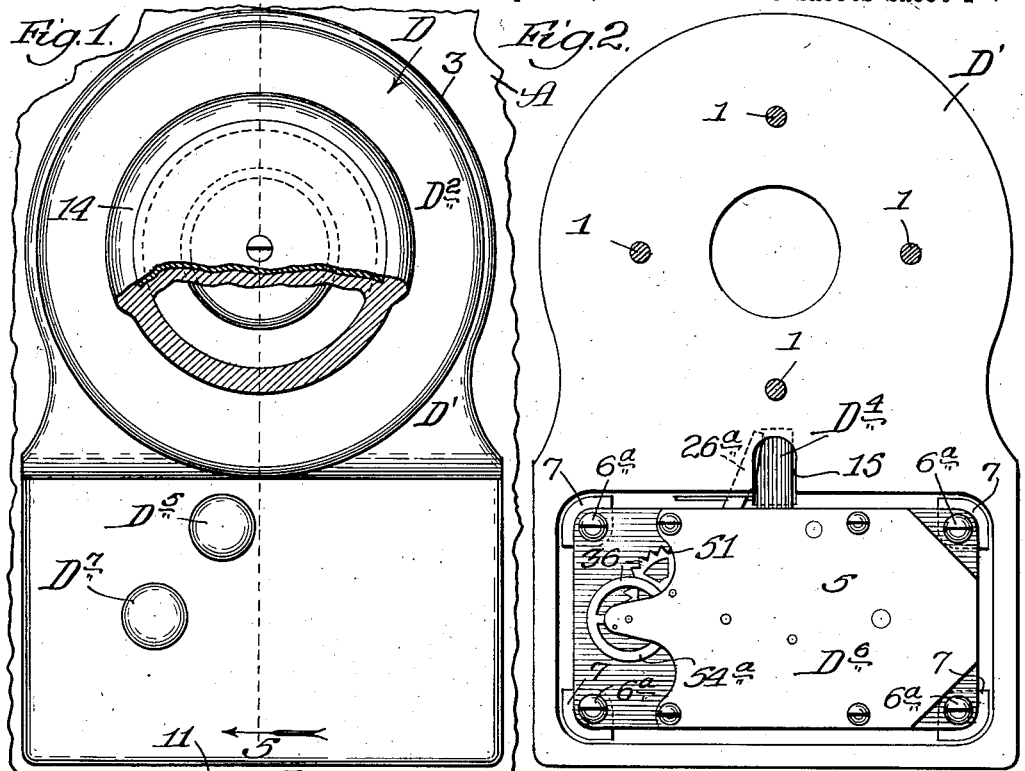
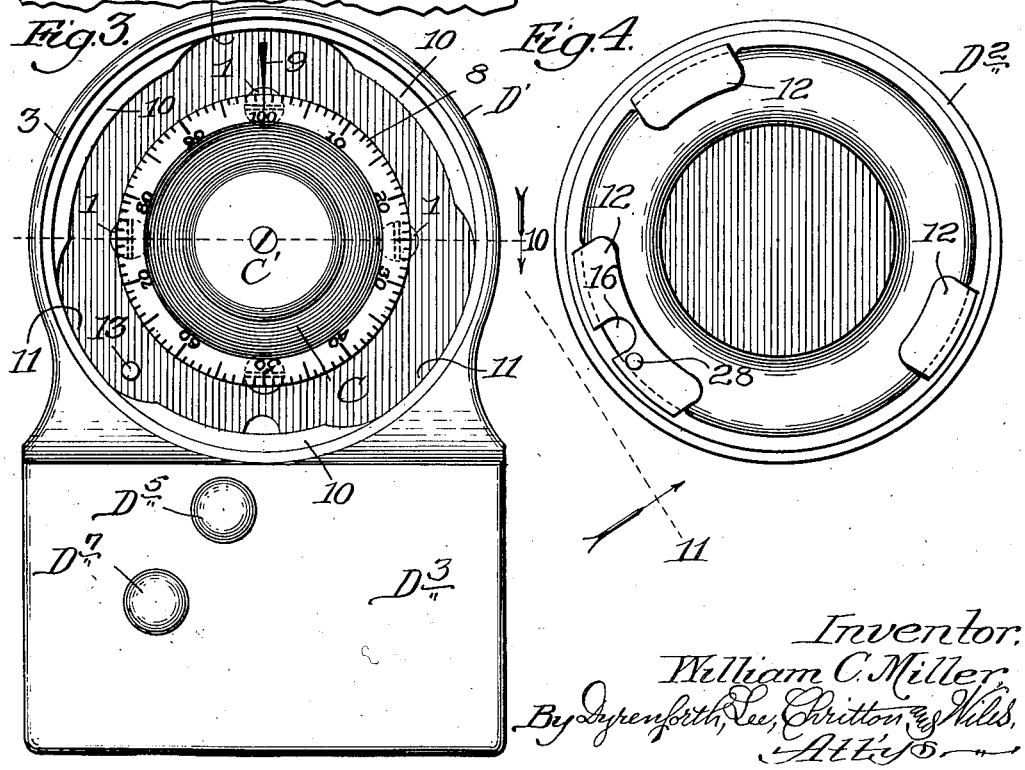

Nov. 24, 1936.  W. C. MILLER  2,062,067
PROTECTIVE DEVICE FOR SAFES
Filed Sept. 24, 1934    5 Sheets-Sheet 3

Inventor:
William C. Miller,
By Dyrenforth, Lee, Chritton & Wiles,
Attys.

Nov. 24, 1936.   W. C. MILLER   2,062,067
PROTECTIVE DEVICE FOR SAFES
Filed Sept. 24, 1934   5 Sheets-Sheet 4
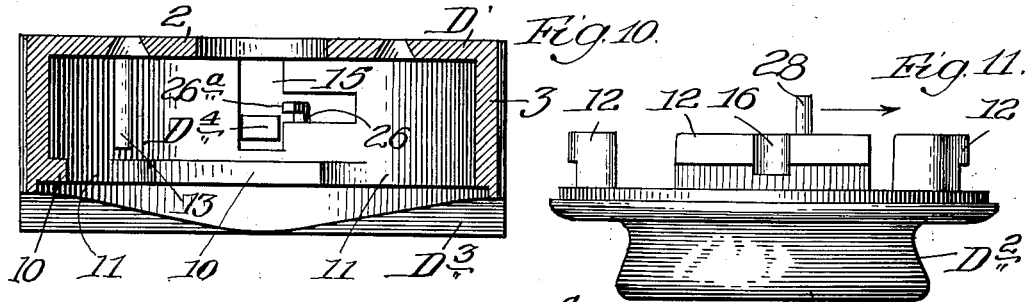
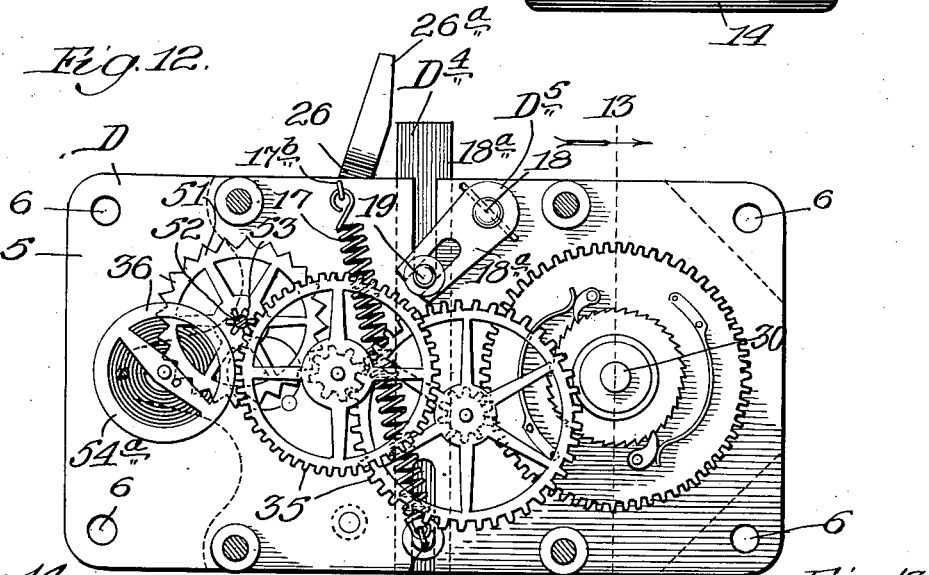
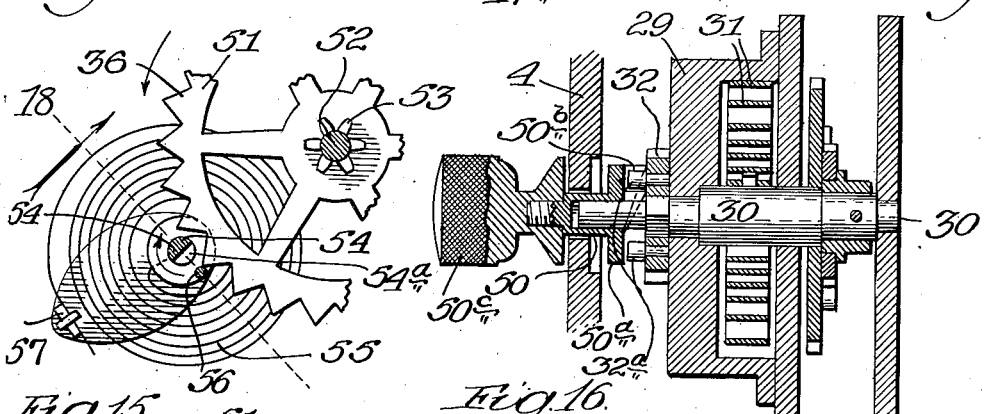
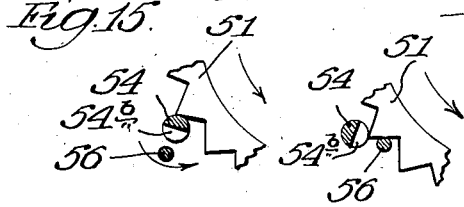

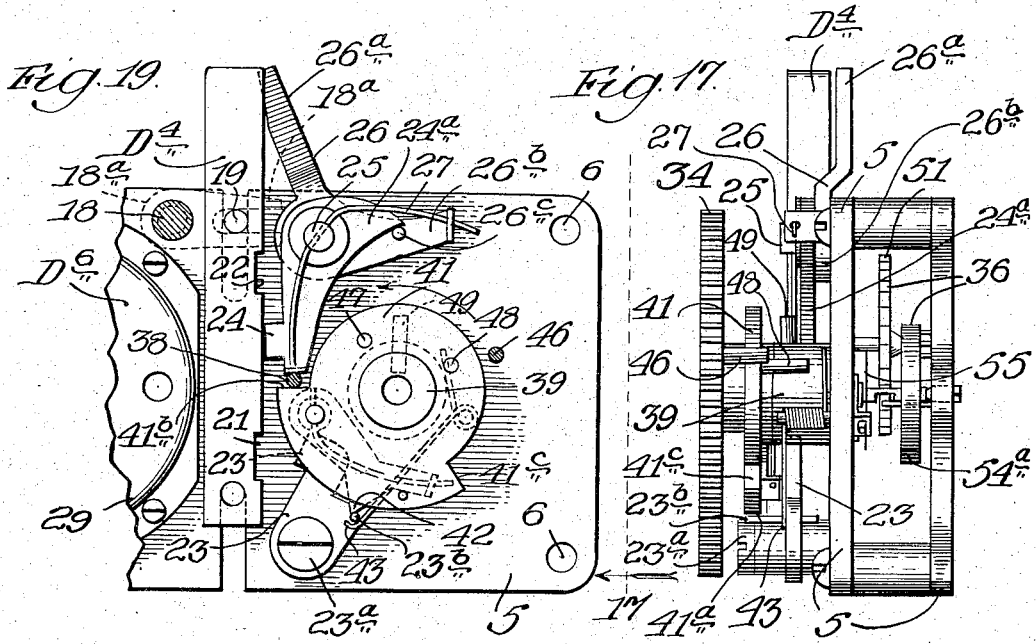
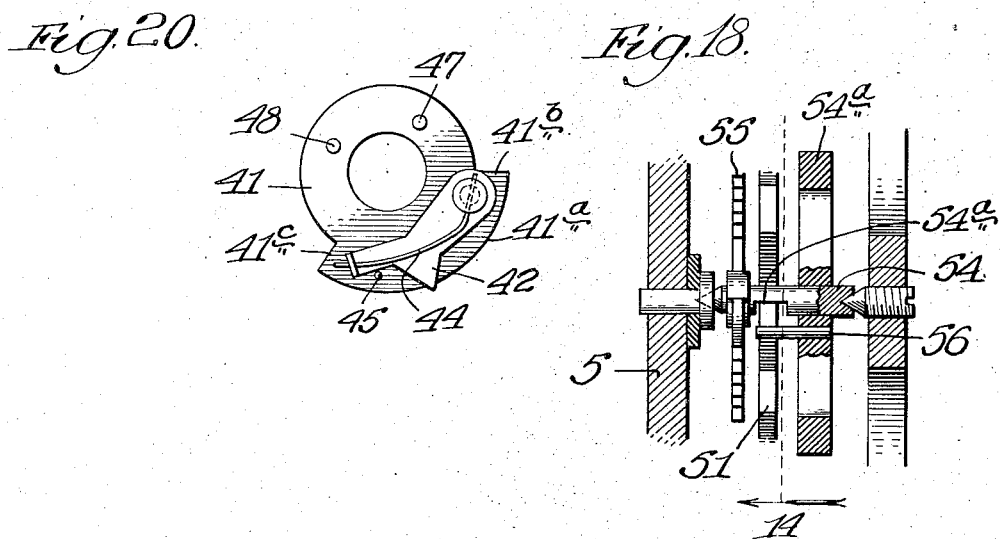

Patented Nov. 24, 1936

2,062,067

UNITED STATES PATENT OFFICE 2,062,067

PROTECTIVE DEVICE FOR SAFES

William C. Miller, Canton, Ohio, assignor to Diebold Safe & Lock Co., Canton, Ohio, a corporation of Ohio Application September 24, 1934, Serial No. 745,323

6 Claims. (Cl. 70—26)

This invention relates particularly to a protective device for safes, or the like, involving the use of a time-control mechanism. The improved device is especially useful for application to combination locks, giving thereto the added protective feature of a time-control. The improved device can be applied readily to safes which are in use, where such safes are equipped with combination locks. The invention is illustrated in a preferred embodiment in the accompanying drawings, in which—

Figure 8:
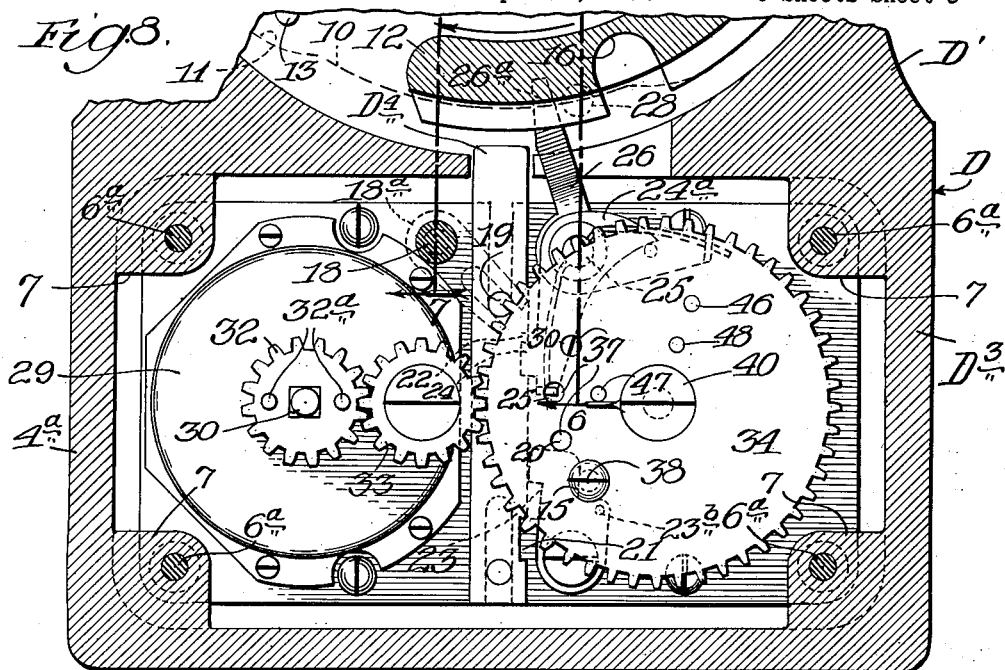
Figure 9:
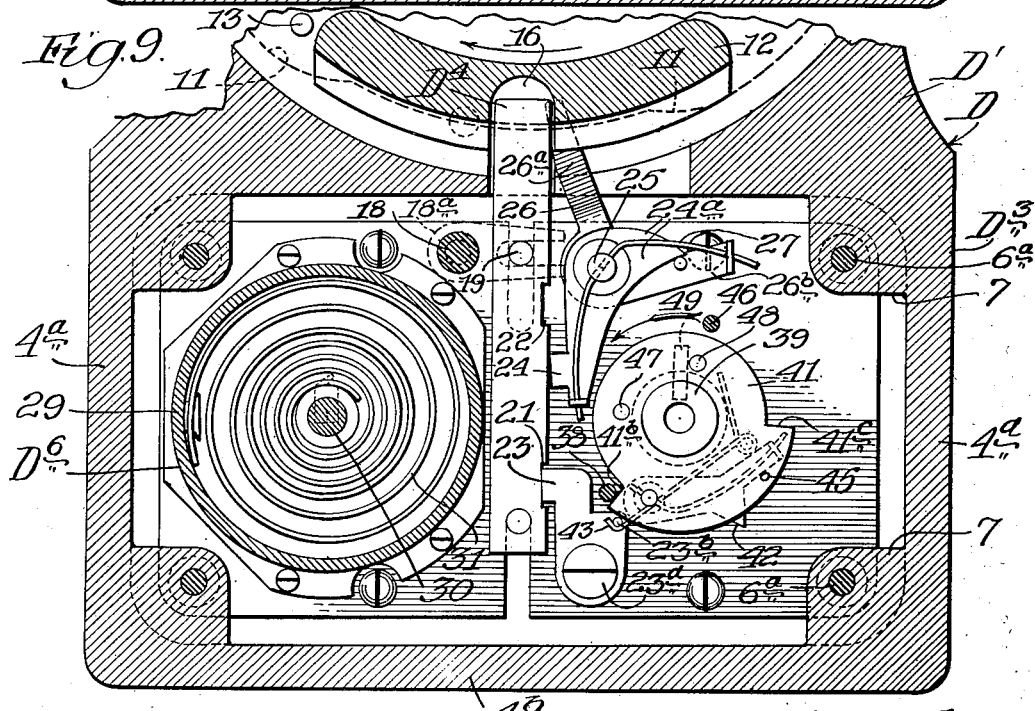

Fig. 1 is a broken elevational view, partly in section, showing the improved device applied to a safe-door equipped with a combination lock; Fig. 2, a rear elevational view of the improved device, which is in the form of a housing for the dial and knob of the combination lock, carrying time-mechanism controlling the locking of the closure of said housing; Fig. 3, a front elevational view of the improved device, the closure thereof having been removed; Fig. 4, an inner face view of the closure; Fig. 5, an enlarged vertical sectional view taken as indicated at line 5 of Fig. 1; Fig. 6, a fragmental sectional view taken as indicated at line 6 of Fig. 8; Fig. 7, a fragmental sectional view taken as indicated at line 7 of Fig. 8; Fig. 8, a broken vertical sectional view, similar to Fig. 9, but showing the position of the parts before the locking operation has been effected; Fig. 9, a broken sectional view taken as indicated at line 9 of Fig. 5; Fig. 10, a horizontal sectional view taken as indicated at line 10 of Fig. 3; Fig. 11, an edge view of the closure, the view being taken as indicated at line 11 of Fig. 4; Fig. 12, a sectional view of the clock mechanism taken as indicated at line 12 of Fig. 5; Fig. 13, a sectional view taken as indicated at line 13 of Fig. 12; Fig. 14, a fragmental view showing on an enlarged scale the escapement device appearing at the left-hand portion of Fig. 12; Figs. 15 and 16, fragmental views illustrating the working of the escapement device; Fig. 17, an edge elevational view of the clock mechanism and attendant parts, the view being taken as indicated at line 17 of Fig. 19; Fig. 18 is an enlarged detailed sectional view taken as indicated at line 18 of Fig. 14; Fig. 19, a broken front elevational view of the clock-frame and attendant parts, including a locking-bolt which serves to secure the closure of the dial-housing in position; and Fig. 20, a bottom view of a cam-device which serves to release the locking-bolt at the end of a predetermined period, thus permitting the bolt, under the action of its spring, to move to the locking position shown in Figs. 6, 9 and 19.

It may be stated preliminarily that the dial-housing which is equipped with a removable closure and which carries an extension in the form of a clock-housing may be secured to a safe-door in the manner illustrated in Fig. 5, the dial and actuating knob being thus housed; also, the closure is normally locked in position by a locking bolt which can be withdrawn only after the operation of the time mechanism. Preferably, the time mechanism is manually wound to place it in condition to unlock the closure; and, preferably, the locking-bolt which secures the closure is manually retracted after the time-mechanism has operated to retract the dog, or auxiliary locking-device, which normally prevents the retraction of the locking-bolt. The closure of the device may be kept removed during the day if desired; or it may be kept applied, and removed only when it is necessary to operate the dial to open the safe-door. Preferably, there is employed a second dog which serves to hold the locking-bolt in retracted position when the closure-device is removed; and preferably this second dog is automatically released in the operation of applying the closure and rotating it to the interlock position, which action permits the locking-bolt to spring into locking engagement with the closure. Thereafter, the closure can be removed only by winding the clock-mechanism and through the medium thereof withdrawing the first-mentioned dog, or auxiliary locking-device, after which it is possible to manually manipulate the locking bolt and effect its withdrawal.

In the construction illustrated, A designates a safe-door, or main closure; B, the spindle of a combination lock which extends through an opening in the door and which is equipped inside the door with the usual parts of a combination lock (not shown); C, a dial fixedly secured to the outer end of the spindle and equipped with an operating knob C'; and D, an improved protective device, shown as comprising a dial-housing D' equipped with a removable closure $D^2$, and an auxiliary housing $D^3$ in which is mounted a locking-bolt $D^4$, actuating means therefor $D^5$, time-mechanism $D^6$, and a winding-device $D^7$.

The dial-housing D' and the auxiliary housing $D^3$ are shown as formed integrally with each other, in the form of a casting, which may be designated as a base-plate, shown secured to the safe-door A, as by means of screws 1.

The housing D' is shown as consisting of a disk 2 having a forwardly projecting flange 3; and the housing $D^3$ is a rectangular box-like structure having a forwardly disposed wall 4 and rearwardly extending side-walls and bottom wall, designated, respectively, 4ª and 4ᵇ. At its upper portion, the wall 4 merges with and is formed integrally with the lower portion of the flange 3.

The housing D³ is open at its rear side, except as it is closed by the front face of the safe-door; and the locking-device and clock-mechanism shown in Figs. 17 and 19 constitute a unit insertable through the rear open end of the housing D³. The frame of the unit just mentioned is designated 5, one plate of this frame (see Fig. 12) being provided at its corner portions with perforations 6 for attachment, as by means of screws 6ª (Fig. 2) to lugs 7 with which the auxiliary housing D³ is provided internally.

While the dial C and operating knob C' are shown as formed integrally, this is not an essential feature; the dial is shown provided with the usual dial-scale and figures indicated at 8, cooperating, in the illustration given, with a mark or arrow 9 with which the disk 2 is provided at its front face. It will be understood, of course, that the usual dial-ring may be employed between the dial and the disk 2, in which case the indicating point 9 would not be needed on the front face of the disk 2.

The circular flange 3 of the dial-housing D' preferably is provided with an in-turned flange 10 which is provided with recesses, or cut-away portions, 11, as shown in Fig. 3. The portions which are not cut away afford interlock lugs. One of the recesses 11 may be of greater width than the others. These recesses are adapted to receive the lugs 12 with which the closure D² is equipped. One of the lugs 12 may be of greater width than the others and adapted to enter the widest one of the recesses 11, while the other lugs enter the narrower recesses. After the lugs have been entered, the closure may be rotated about its axis to bring the lugs into interlocking relation. If desired, the housing D' may be equipped with a fixed stud, or lug 13 (Figs. 3 and 9) adapted to be engaged by a lug 12 when the closure reaches the locking position. The closure D² is shown provided with a relatively large hollow knob 14 which serves as a means for applying and removing the closure. Preferably the closure completely conceals the operating knob, as well as the indicia on the dial.

As shown in Fig. 5, the lower portion of the dial-housing D' is recessed or cut away, as indicated at 15, to facilitate assembly and provide an opening through which the bolt D⁴ may work. One of the lugs 12 of the closure D² is provided with a socket 16 which receives the upper end of the locking bolt.

As has been indicated, the lock D⁴, the actuating means therefor, and the time-mechanism D⁶ constitute a unit which is insertable in the auxiliary housing D³ through the open rear side thereof.

The locking-bolt D⁴ is vertically disposed and suitably guided on the frame 5. A coiled spring 17 is attached to the lower end of the bolt, as indicated at 17ª, while the upper end of said spring is connected at 17ᵇ (Fig. 12) to the frame 5. The bolt will, when released by the action of the closure in bringing the latter to the locking position, be projected by the spring 17 to automatically lock the closure in position with its lugs 12 in interlocking relation with the lugs 10 of the housing D'.

The bolt-retracting mechanism D⁵ comprises a rock-shaft 18 journaled in the frame 5 and equipped with a fixed yoke 18ª which engages a stud 19 with which the bolt D⁴ is equipped. The rock-shaft 18 is provided at its forward end with a reduced threaded portion upon which is screwed the tapped shank 20 of an actuating knob 20ª which is located in front of the wall 4. The shank 20 extends through an opening in the wall 4, as will be understood from Fig. 5.

The bolt D⁴ is provided at one lateral edge with a lower recess 21 and an upper recess 22. As shown in Fig. 1, the bolt, when in the locking position, is engaged by a dog, or auxiliary locking device, 23, the withdrawal of which is controlled by the time-mechanism. As indicated in Fig. 8, the recess 22 is adapted to be engaged, when the bolt is in the retracted position, by a dog, or pawl, 24 (see also Fig. 19). The dog 24 is supported on a pivot 25 which extends forwardly from the front plate of the frame 5. Supported on the same pivot is a releasing-lever 26 which has an actuating arm 26ª and an arm 26ᵇ equipped with a stud 26ᶜ which is adapted to effect release when the arm 26ª is moved to the left from the position shown in Fig. 8 to the position shown in Fig. 19. A spring 27 serves to throw the dog 24 to the locking position shown in Fig. 8, and serves normally to hold the stud 26ᶜ in engagement with the short arm 24ª of the dog 24.

It will be noted that the upper portion of the arm 26ª has been struck rearwardly somewhat, so that the arm will work behind the bolt D⁴. The lever 26 is actuated to release the bolt D⁴ from its retracted position by means of a pin 28 which extends rearwardly from the large lug 12 of the closure (see Figs. 8 and 11). This action occurs after the lugs of the closure have been inserted through the recesses 11 shown in Fig. 3 and while the closure is being rotated to the locking position. When this position is reached, the bolt D⁴ springs upwardly automatically and enters the recess, or socket, 16, as will be understood from Fig. 9. The bolt D⁴ is then locked in the projected position by the dog 23, the release of which is effected by the time-mechanism in the manner illustrated in Fig. 19. When the bolt is released, it may be manually withdrawn through the medium of the bolt-actuating device D⁵; and when fully withdrawn, the dog 24 automatically snaps into the recess 22 to hold the bolt in retracted position.

The time-mechanism D⁶ comprises suitable clock-mechanism, equipped with a timing-device for effecting release of the auxiliary locking-device 23. As shown, the mechanism comprises a spring housing 29; a shaft 30; a main spring 31 connected at one end with the housing and at the other end with the shaft, the shaft being equipped at its forward end with a pinion 32 equipped with studs 32ª; a gear 33 adapted to be actuated by the clock through the medium of the gear 32; a gear 34 which serves to actuate a device for releasing the auxiliary locking-device 23; and a gear-train 35 which controls the actuation of the shaft 30 by the mainspring, said gear-train being, in turn, controlled by an escapement device, indicated at 36.

The gear 34 is provided with an arcuately arranged series of tapped openings, as indicated at 37 (Fig. 8). Associated with these openings are the numbers 15, 20, 25, and 30, indicating minutes. A screw 38 may be inserted through any one of these openings, the lower end of the screw serving as a means for actuating the timing-device, which may be caused to effect release of the dog 23 after a predetermined period.

The gear 34 is journaled on the upper end of a post 39 (Figs. 8, 9, 17 and 19), the gear being secured in position by means of a screw 40. Journaled upon the same stud is an oscillatory disk 41 which carries a pawl 42 which is adapted to release the dog 23 from engagement with the bolt D⁴. The dog 23 is supported by a pivot 23ᵃ, and is equipped with a pin 23ᵇ which is adapted to be engaged by the tooth of the pawl 42. A spring 43 serves to throw the dog 23 to the locking position. The pawl 42 is normally held in the position shown in Fig. 20 by means of a spring 44, which causes the pawl to engage a limiting pin 45.

The disk 41 is provided with an enlargement in the form of a sector 41ᵃ which has at its ends shoulders 41ᵇ and 41ᶜ. The shoulder 41ᵇ is adapted to be engaged by the screw, or adjustable stud, 38, carried by the gear 34; and the shoulder 41ᶜ is adapted to be engaged by a stud 46 which depends from the gear 34. The member 41 is equipped with a spaced pair of studs 47 and 48, either one of which may be brought into engagement with a horizontally disposed stud, or stop, 49 which projects from the fixed post 39.

As will be understood from Figs. 5 and 13, the gear 32 may be turned to wind the clock spring by means of the device D⁷. This device comprises a shank 50 journaled in the front wall 4 of the housing D³, said shank being equipped inside the casing-wall with a head 50ᵃ equipped with jaws 50ᵇ which are adapted to engage the studs 32ᵃ of the gear 32. The shank 50 has a reduced, threaded outer end to which is applied a knob 50ᶜ. When the gear 32 is turned clock-wise, as viewed in Fig. 8, to wind the spring, the gear 34 likewise is turned clock-wise. Referring to Fig. 9, such action would bring the stud 46 into engagement with the shoulder 41ᶜ and cause the disk 41 to move clock-wise until the tooth of the pawl 42 passes the pin 23ᵇ of the auxiliary locking-device 23. This movement would be continued until the stop 47 is brought into engagement with the stop 49, and the screw, or adjustable stud 38, would be carried away from the shoulder 41ᵇ a greater or lesser distance, depending upon the position of the stud 38 on the gear 34. That is, the distance the stud 38 would move away from the shoulder 41ᵇ would depend upon the time interval to elapse before release of the auxiliary locking-device 23. It will be understood that the tooth of the pawl 42 may snap past the pin 23ᵇ when the disk 41 is carried clock-wise. Fig. 19 shows the dog 23 being held in the released position. It is so held for a short period, say two or three minutes. During this short interval, the locking-bolt D⁴ may be retracted. If not retracted, the bolt D⁴ would be again locked by the dog 23 after the tooth of the pawl 42 passes the pin 23ᵇ. Fig. 9 assumes that the bolt D⁴ was not retracted. Consequently, it was again locked by the dog 23. In Fig. 9, the clock has driven the disk 41 to the limit of its movement counter-clockwise, in which position the stud 48 engages the stop 49. In the next winding operation, the stud 46, carried by the gear 34, engages the shoulder 41ᶜ and rotates the member 41 clock-wise, thus carrying the tooth of the pawl 42 past the pin 23ᵇ and into readiness to effect release of the dog 23 when the time-mechanism operates to effect such release.

It may be observed that an operator, familiar with the mechanism, may retract the bolt D⁴ during the interval while the dog 23 is held in retracted position. A robber, not familiar with the operation, might allow this period to pass without effecting retraction of the bolt, whereupon it would be necessary to wind the clock and permit it to operate again before it would be possible to retract the bolt D⁴.

Referring now to the escapement device 36 which controls the gear-train 35, which, in turn, controls the rotation of the shaft 30 under the action of the mainspring, the construction and operation of the device will be understood from Figs. 12—18. 51 designates an escapement-wheel which is fixedly mounted on a shaft 52 actuated by a pinion 53 constituting a part of the gear-train 35. Suitably journaled adjacent the periphery of the escapement wheel 51 is a balance-wheel shaft 54 equipped with a balance wheel 54ᵃ. The shaft 54 is connected with the balance-wheel spring 55 in the usual manner. The shaft 54 is so journaled that it may engage the balance-wheel in the manner shown in Fig. 15. It is provided, however, with a cut-away part 54ᵇ, so that when the shaft oscillates to the position shown in Fig. 16, it will permit movement of the escapement wheel. The balance-wheel is equipped with a pin 56, and this pin and the cut-away shaft 54 control the movement of the escapement wheel 51. The mainspring, of course, tends to rotate the wheel 51 in the direction indicated by the arrow in Fig. 15. The movement is normally arrested by the shaft 54. As the wheel 51 rotates, a tooth strikes the pin 36 as shown in Fig. 16 and causes the balance-wheel to rotate against the tension of its spring to the position shown in Fig. 15. The balance wheel then returns under the action of its spring, turning the shaft 54 from the position shown in Fig. 15 to the position shown in Fig. 16, thus permitting the tooth of the escapement wheel to pass the shaft 54.

In time-mechanism which is normally idle and which operates after winding, such mechanism not being provided with a detent which needs to be removed to permit the clock to operate, it is important to have escapement-mechanism which will permit the clock to operate with certainty, merely as a result of the winding operation. The improved escapement device described accomplishes this purpose.

In Fig. 14 is indicated an air-spring tensioning device 57, which may be of any approved construction. It will be understood, also, that ordinarily a pin is employed to limit the oscillation of the balance-wheel 54ᵃ when it is turning in such direction as to increase the tension of the air-spring.

The detailed description given above renders clear the manner in which the improved protective device may be applied to a combination lock and may be operated. By way of résumé, it need only be stated that when the closure D² is applied to conceal the combination lock and prevent access thereto, the lugs 12 are entered through the recesses 11 of the flange 10 of the housing D', and the closure is then turned to bring about the proper interlocking of the lugs, during which operation one of the lugs 12 strikes the releasing lever 26, which releases the dog 24 and permits the bolt D⁴ to shut into locking engagement with the socket 16 of the closure D². Thereupon, the dog 23 locks the bolt D⁴ against withdrawal. Winding of the clock and actuation of the time-mechanism is necessary to withdraw the dog 23 before the bolt can be retracted. The device may be set to effect this result after the lapse of any desired predetermined period of time. While the point of the tooth of the pawl 42 is passing the pin 23ᵇ of the dog 23, the dog is held in retracted position for a short interval, at which time it is possible to retract the bolt D⁴ through the medium of the bolt-retracting device D⁵. If one fails to seize the opportunity to retract the bolt, the pawl 42 finally passes the pin 23ᵇ and permits the dog 23 to snap again into position to lock the bolt D⁴ against retraction.

Should an attendant be compelled by a robber to open the safe while protected by the improved device, the attendant could do nothing more in the first instance than wind the clock-mechanism and await the action of the time-mechanism to effect release of the auxiliary locking-device 23. Should the interval in which the device 23 is held in retracted position pass without retracting the bolt D⁴, the closure D² could not be removed without again winding the clock.

The foregoing detailed description is given for clearness of understanding only, and no unnecessary limitations should be understood therefrom, but the appended claims should be construed as broadly as permissible in view of the prior art.

What I regard as new and desire to secure by Letters Patent is:

1. In mechanism of the character set forth, a unit comprising: a frame; a locking-bolt slidably mounted in said frame; a bolt-retracting device pivotally mounted in said frame and equipped with means for retracting said bolt; clock-mechanism mounted in said frame; and a pair of dogs adapted to alternately secure said bolt against movement, one of said dogs being released by said clock-mechanism and the other of said dogs being equipped with a releasing lever projecting above said frame and disposed adjacent the extremity of said locking-bolt.

2. In a device of the character set forth: a unit comprising a clock-frame; a clock mounted therein; a locking-bolt slidably mounted in said frame and projecting above an edge thereof, said bolt being provided with a pair of spaced notches; manually actuated bolt-retracting means mounted on said frame; an auxiliary locking-device adapted to engage one of said notches when the bolt is projected; a device actuated by said clock-mechanism serving to retract said auxiliary locking device after a predetermined period of time; a dog mounted in said frame adapted to engage the other notch of said bolt when the bolt is in retracted position; and a releasing lever associated with said dog and having an actuating arm associated with the free end of said bolt.

3. In combination with a closure: a housing; a unit mounted in said housing comprising spring-actuated time-mechanism equipped with a winding-device extending through a wall of said housing, a spring-projected locking-bolt normally securing said closure in locked position, a manually actuated bolt-retracting device having actuating means extending through a wall of said housing, a dog serving to hold said bolt in retracted position after withdrawal of the bolt, a pivoted releasing lever adapted to retract said dog, and an auxiliary locking-device for preventing retraction of said bolt adapted to be released by said time-mechanism; and a lug carried by said closure adapted to actuate said lever when the closure is moved to locking position.

4. In mechanism of the character set forth, a unit, comprising: a frame; a locking-bolt provided with a pair of spaced shoulders mounted in said frame; a bolt-retracting device pivotally mounted in said frame and equipped with means for retracting said bolt; clock-mechanism mounted in said frame; and a pair of dogs adapted to alternately engage said shoulders to secure said bolt against movement, one of said dogs being released by said clock-mechanism and the other of said dogs being equipped with a releasing member projecting above said frame and disposed near the extremity of said locking-bolt.

5. In mechanism of the character set forth, a unit comprising: a frame; a locking-bolt mounted in and projecting above said frame; a bolt-retracting device mounted in said frame and equipped with means for retracting said bolt; clock-mechanism mounted in said frame; a dog mounted in said frame adapted to hold said bolt in retracted position, said dog being equipped with a member projecting above said frame for effecting release of said dog; a second dog serving to lock said bolt in projected position; and a device actuated by said clock-mechanism serving to release said second-mentioned dog after a predetermined period of time, hold the same in released position for a short period, and then permit it to return to bolt-locking position.

6. In mechanism of the character set forth, a unit comprising: a frame; a spring-projected locking bolt mounted in said frame; means mounted in said frame for retracting said locking-bolt; a dog adapted to lock said bolt in projected position; and time-mechanism equipped with means for releasing said dog after a predetermined period of time, holding it for a short period in released position, and then permitting it to return to bolt-locking position.

WILLIAM C. MILLER.